US009908479B2

(12) United States Patent
Lee

(10) Patent No.: US 9,908,479 B2
(45) Date of Patent: Mar. 6, 2018

(54) SUPPORTER FOR HOLDING ELECTRONIC DEVICE OR ARTICLE IN VEHICLE

(71) Applicant: Hyundai Motor Company, Seoul (KR)

(72) Inventor: Han-Jong Lee, Incheon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/948,611

(22) Filed: Nov. 23, 2015

(65) Prior Publication Data

US 2017/0096112 A1     Apr. 6, 2017

(30) Foreign Application Priority Data

Oct. 5, 2015     (KR) .......................... 10-2015-0139591

(51) Int. Cl.
*B60R 11/02*     (2006.01)
*B60R 11/00*     (2006.01)

(52) U.S. Cl.
CPC ......... *B60R 11/02* (2013.01); *B60R 2011/007* (2013.01); *B60R 2011/0015* (2013.01); *B60R 2011/0288* (2013.01)

(58) Field of Classification Search
CPC ............. B60R 11/02; B60R 2011/0015; B60R 2011/007; B60R 2011/0288
USPC ................................................ 224/275, 483
See application file for complete search history.

(56) References Cited

U.S. PATENT DOCUMENTS

| | | | |
|---|---|---|---|
| 5,018,633 A * | 5/1991 | Toth ....................... | B60N 3/102 224/483 |
| 5,071,002 A | 12/1991 | Bradley | |
| 5,106,003 A * | 4/1992 | Ma ......................... | B60N 3/002 108/44 |
| 5,205,525 A | 4/1993 | Peck | |
| 5,509,633 A * | 4/1996 | Ruster .................... | B60N 3/108 220/23.8 |
| 5,527,008 A * | 6/1996 | Schutter ................. | B60N 3/102 224/926 |
| 6,345,723 B1 * | 2/2002 | Blake .................. | A47G 23/0241 211/73 |
| 6,808,097 B2 * | 10/2004 | Kim ...................... | B60N 2/4686 224/282 |
| 7,114,755 B1 * | 10/2006 | Sturt ...................... | B60N 3/102 296/24.34 |
| 7,168,669 B2 * | 1/2007 | Park ....................... | B60N 3/101 224/539 |

(Continued)

FOREIGN PATENT DOCUMENTS

| | | |
|---|---|---|
| JP | 3199519 U | 8/2015 |
| KR | 20-1998-0045572 U | 9/1998 |

(Continued)

*Primary Examiner* — Peter Helvey
(74) *Attorney, Agent, or Firm* — Mintz Levin Cohn Ferris Glovsky and Popeo, P.C.; Peter F. Corless

(57) ABSTRACT

A supporter for a vehicle includes a pair of brackets separated from each other so as to face each other, one end of each of the brackets being fixed to a holding part held inside of the vehicle, and cubes installed between the brackets so as to be rotatable, the cubes having a polyhedral shape, and one or more holding holes formed on at least two surfaces of the cubes. The supporter selectively supports or holds various goods, such as cup holders, various articles and electronic devices, according to the sizes of the goods, thereby efficiently using space and increasing user convenience.

5 Claims, 2 Drawing Sheets

(56) References Cited

U.S. PATENT DOCUMENTS

| | | | | |
|---|---|---|---|---|
| 8,042,780 B2 * | 10/2011 | Wagner | ................. | B60N 3/102 |
| | | | | 248/311.2 |
| 9,016,650 B2 * | 4/2015 | Thurman | ................. | A47C 7/62 |
| | | | | 248/311.2 |
| 2010/0327031 A1 * | 12/2010 | Olmos | ..................... | A45F 5/02 |
| | | | | 224/269 |
| 2011/0297714 A1 * | 12/2011 | Freeman | .................. | B60R 7/04 |
| | | | | 224/483 |

FOREIGN PATENT DOCUMENTS

| KR | 2002-60313 | 1/2002 |
|---|---|---|
| KR | 1020070031002 A | 3/2007 |
| KR | 10-2013-0033755 A | 4/2013 |
| KR | 10-1371249 B1 | 3/2014 |
| KR | 101407844 B1 | 6/2014 |

\* cited by examiner

SUPPORTER FOR HOLDING ELECTRONIC DEVICE OR ARTICLE IN VEHICLE

CROSS-REFERENCE TO RELATED APPLICATION

This application claims under 35 U.S.C. § 119(a) the benefit of Korean Patent Application No. 10-2015-0139591, filed in the Korean Intellectual Property Office on Oct. 5, 2015, the entire contents of which are incorporated herein by reference.

BACKGROUND

1. Field of the Invention

The present invention relates to a supporter for a vehicle, and more particularly, to a supporter configured to support an electronic device or article of a user while the user rides in the vehicle.

2. Description of the Related Art

In general, in vehicles such as buses, in order to satisfy passenger convenience, a cup holder or a pocket to contain belongings or garbage is installed on a front seat back of a vehicle seat.

Since most passengers generally possess one or more electronic devices, such as a portable terminal, a PDA, a portable game machine, a display device, etc., space is needed in a vehicle to keep, hold and support these electronic devices for convenience of passengers.

In general, if a passenger views a screen or uses the Internet through an electronic device, such as a PDA, the passenger needs to hold the electronic device which may be inconvenient. Further, if the electronic device is not be held on a separate supporter or holder, then it generally needs to be put into a passenger's bag or pocket or inserted into a pocket formed on a front seat back.

SUMMARY

Therefore, it is an object of the present invention to provide a supporter for use in a vehicle on which an electronic device or an article may be held or laid so that a passenger may more conveniently use and keep the electronic device or article.

In accordance with the present invention, the above and other objects can be accomplished by the provision of a supporter for a vehicle including a pair of brackets separated from each other so as to face each other, one end of each of the brackets being fixed to a holding part held inside of the vehicle, and cubes installed between the brackets so as to be rotatable, wherein the cubes have a polyhedral shape and one or more holding holes are formed on at least two surfaces of the cubes.

The cubes may include two or more connection members connected in a length direction so as to be rotatable with respect to each other.

Among two neighboring cubes, one of the holding holes formed on the cube placed at one side and one of the holding holes formed on the cube placed at another side may communicate with each other so as to form an enlarged holding hole having a greater length than that of one cube.

The holding holes formed on one surface of each of the cubes and the holding holes formed on the other surface of each of the cubes may be formed in different sizes or shapes.

The supporter may further include a head having a disc shape and formed on at least one of the brackets and a fixing part having a ring shape and formed on one side surface of the cube contacting the head such that the head is inserted into the fixing part.

At least one magnet or magnetic body may be mounted on the head and at least one additional magnet or magnetic body having the opposite polarity to the at least one magnet or magnetic body mounted on the head may be mounted on the side surface of the cube contacting the head so that attractive force is applied therebetween.

The holding part may be installed on a seat back within the vehicle.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
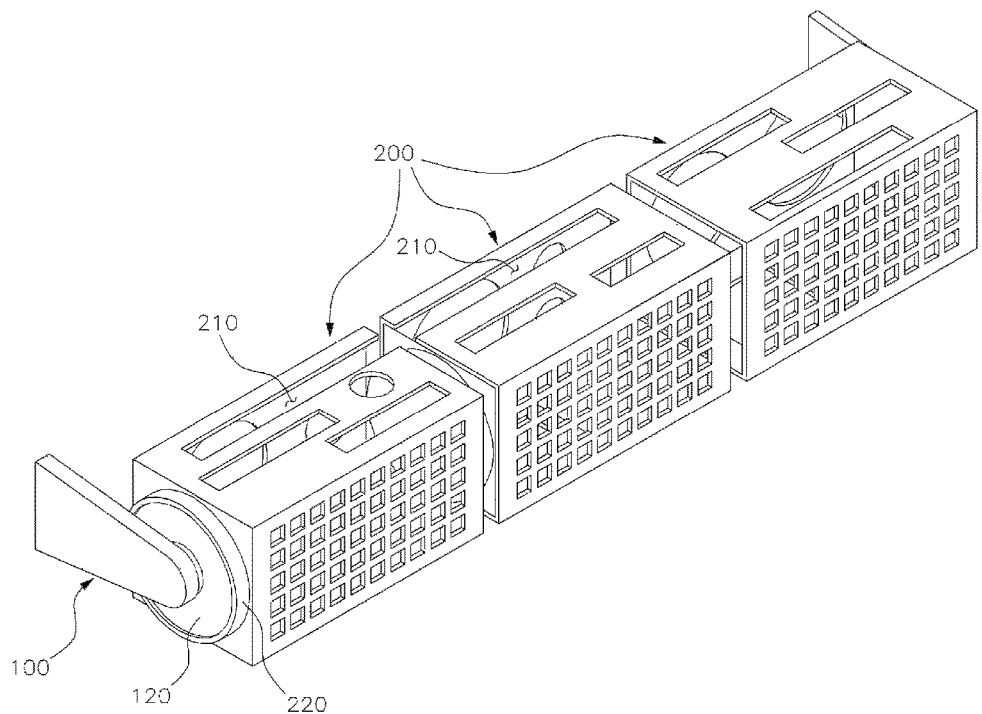
FIG. 1 is a perspective view illustrating a supporter for a vehicle in accordance with an exemplary embodiment of the present invention.

Reference will now be made in detail to the preferred embodiments of the present invention, examples of which are illustrated in the accompanying drawings. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments within the spirit and scope of the invention as defined by the appended claims.

In the following description of the present invention, a detailed description of known functions and configurations incorporated herein will be omitted when it may make the subject matter of the present invention rather unclear. Throughout the specification, some elements which are the same as or similar to each other are denoted by the same reference numerals even though they are depicted in different drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, preferred embodiments of the present invention will be described in detail with reference to the annexed drawings.

Figure 2:
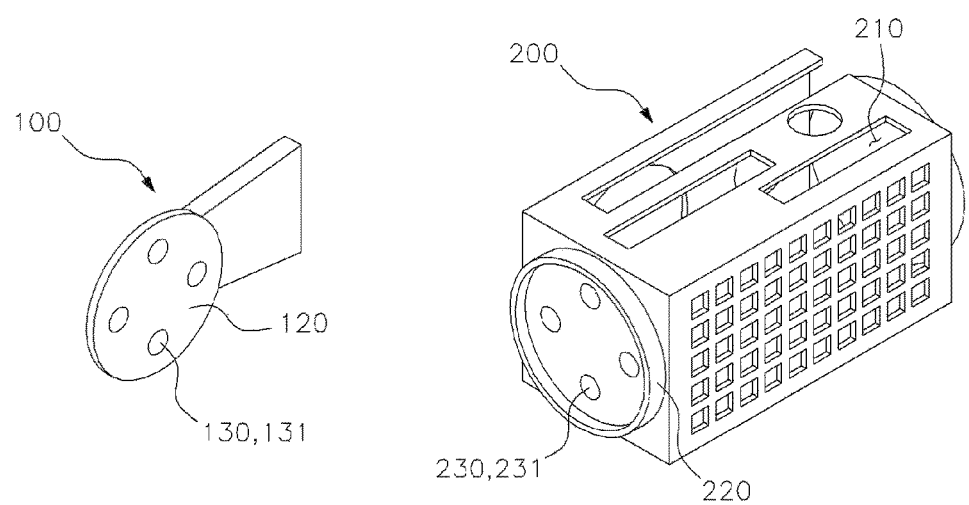
FIG. 2 is a perspective view illustrating a bracket and a cube of the supporter as shown in FIG. 1, prior to connection.
Figure 3:
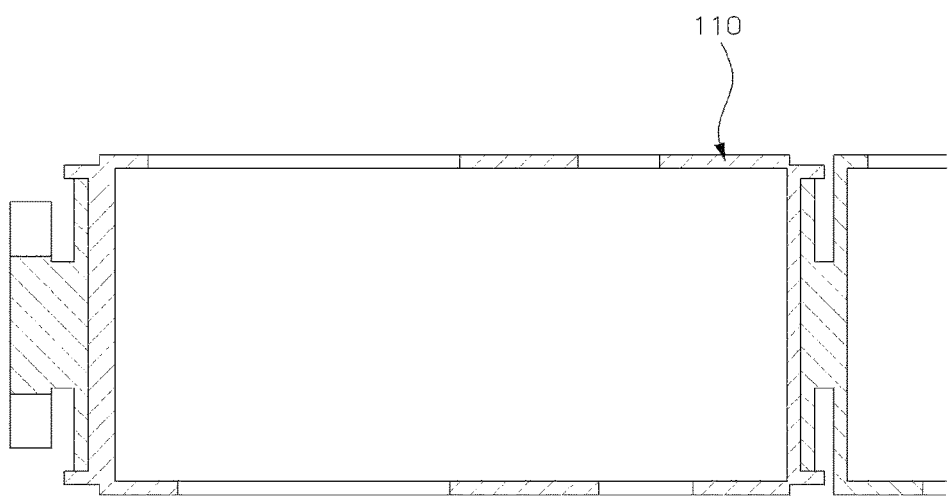
FIG. 3 is a cross-sectional view of a connection member shown in FIG. 1.

FIG. 1 is a perspective view illustrating a supporter for a vehicle in accordance with an exemplary embodiment of the present invention, FIG. 2 is a perspective view illustrating a bracket and a cube of the supporter of FIG. 1, prior to connection, and FIG. 3 is a cross-sectional view of a connection member shown in FIG. 1.

With reference to FIGS. 1 to 3, a supporter for a vehicle in accordance with an exemplary embodiment of the present invention includes brackets 100 and cubes 200.

Preferably two brackets 100 are separated from each other so as to face each other. Each of the brackets 100 has a similar structure, and thus each bracket thereof will be referred to as a bracket 100. One end of the bracket 100 is fixed to a holding part which may be held inside of a vehicle. Such a holding part may be fixed to a front or rear seat back within the vehicle. Further, a head 120 having a disc shape is formed on at least one of the brackets 100. One magnet 130 or magnetic body 131 or a plurality of magnets 130 or magnetic bodies 131 may be mounted on the head 120.

The cubes 200 may be installed between the brackets 100 so as to be rotatable. The cubes 200 may have a polyhedral shape, and one or more holding holes 210 may be formed on at least two surfaces of the cubes 200. Further, among two neighboring cubes 200, one of the holding holes 210 formed on the cube 200 placed at one side and one of the holding holes 210 formed on the cube 200 placed at another side (i.e., the other side) may communicate with each other so as to form an enlarged holding hole 210 having a greater length than that of one cube 200. Therefore, if a passenger spreads or erects a sheet of paper, such as a book or a newspaper, one or more holding holes 210 may be required, such a holding hole 210 having an increased length may be formed by connecting the holding holes 210 of the cubes 200. Further, the holding holes 210 formed on different surfaces may be formed in different sizes or shapes. Thereby, various articles may be held and laid in the holding holes 210. Further, in order to rotate the cubes 200, the cubes 200 may include two or more connection members 110 connected in the length direction so as to be rotatable with respect to each other.

The cube 200 may include a fixing part 220 so as to be combined with the head 120 of the bracket 100. Such a fixing part 220 having a ring shape, into which the head 120 is inserted, may be formed on one side surface of the cube 200 contacting the head 120. Further, one additional magnet 230 or magnetic body 231 or an additional plurality of magnets 230 or magnetic bodies 231 having the opposite polarity to the magnet(s) 130 or magnetic body or bodies 131 mounted on the head 120 may be mounted on the fixing part 220 so that attractive force is applied between the magnets 230 or magnetic bodies 231 and the magnets 130 or magnetic bodies 131. If, in order to determine the holding hole 210 required by a user, the user rotates the cubes, the magnets 130 or magnetic bodies 131 and the magnets 230 or magnetic bodies 231 having the opposite polarities serve to fix the rotated cubes 200. Further, when a user holds an article in the holding hole 210, the cubes 200 are not arbitrarily rotated and thus, a possibility of safely holding the article may be increased and damage to the article may be prevented.

The number of the cubes 200 is not limited to three, as exemplarily shown in FIG. 1, and may be increased or decreased according to the size of a seat back, user requirements, or a desired strength or rigidity of the supporter. Further, holes may be formed at parts of the cubes 200, at which holding holes 210 are not formed, so that articles held in the holding holes 210 may be seen, but the holes may be closed so as to conceal the articles.

As apparent from the above description, a supporter in accordance with the present invention may selectively support or hold various goods, such as cup holders, various articles and electronic devices, according to the sizes of the goods, thereby efficiently using space and increasing user convenience.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A supporter for a vehicle, comprising:
a pair of brackets separated from each other so as to face each other, one end of each of the brackets being fixed to a holding part held inside of the vehicle; and
cubes installed between the brackets so as to be rotatable, wherein the cubes have a polyhedral shape, and one or more holding holes are formed on at least two surfaces of the cubes,
wherein the cubes include two or more connection members connected in a length direction so as to be rotatable with respect to each other, and
wherein, among two neighboring cubes, one of the holding holes formed on the cube placed at one side and one of the holding holes formed on the cube placed at another side communicate with each other so as to form an enlarged holding hole having a greater length than that of one cube for receiving an article.

2. The supporter according to claim 1, wherein the holding holes formed on the at least two surfaces of the cubes are formed in different sizes or shapes.

3. The supporter according to claim 1, further comprising:
a head having a disc shape and formed on at least one of the brackets; and a fixing part having a ring shape and formed on one side surface of the cube contacting the head such that the head is inserted into the fixing part.

4. The supporter according to claim 3, wherein:
at least one magnet or magnetic body is mounted on the head; and
at least one additional magnet or magnetic body having the opposite polarity to the at least one magnet or magnetic body mounted on the head is mounted on the side surface of the cube contacting the head so that attractive force is applied therebetween.

5. The supporter according to claim 1, wherein the holding part is installed on a seat back within the vehicle.

* * * * *